United States Patent [19]

Kubo et al.

[11] 4,406,181
[45] Sep. 27, 1983

[54] AUTOMATIC TRANSMISSION CONTROL SYSTEM WITH HOLDDOWN DEVICE

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Aichi, Japan

[21] Appl. No.: 210,225

[22] Filed: Nov. 25, 1980

[30] Foreign Application Priority Data

Mar. 27, 1980 [JP] Japan .................... 55-39538

[51] Int. Cl.³ .................... B60K 41/10; B60K 41/06
[52] U.S. Cl. .................... 74/869; 74/868; 74/878; 74/867
[58] Field of Search .................... 74/867, 868, 869, 878

[56] References Cited

U.S. PATENT DOCUMENTS

| | | | |
|---|---|---|---|
| 3,685,372 | 8/1972 | Miyazaki | 74/869 |
| 3,710,652 | 1/1973 | Miyazaki | 74/869 |
| 3,774,629 | 11/1973 | Enomoto | 74/867 |
| 3,783,713 | 1/1974 | Will | 74/867 |
| 3,785,224 | 1/1974 | Will | 74/867 |
| 3,895,542 | 7/1975 | Miyauchi | 74/867 |
| 4,052,930 | 10/1977 | Hiramatsu | 74/869 |
| 4,148,232 | 4/1979 | Moriya | 74/869 |
| 4,252,148 | 2/1981 | Fochtman | 74/869 |

Primary Examiner—Kenneth Dorner
Assistant Examiner—D. Wright

Attorney, Agent, or Firm—Stevens, Davis, Miller & Mosher

[57] ABSTRACT

An automatic transmission includes a gear transmission mechanism with several friction engaging mechanisms. Selective supply of actuating pressure to these mechanisms selectively provides different speed stages from the transmission, including a directly connected speed stage and an overdrive speed stage. A driver operated manual selector valve can be set to several forward ranges including a "D" range, and produces a lower range pressure when any forward range except for "D" range is selected thereon. A kickdown pressure is produced when the accelerator pedal of the vehicle is depressed beyond a predetermined amount. An electrically operated pressure control device produces a holddown pressure signal according to operating conditions of the vehicle. A direct/overdrive shift valve controls supply of pressure to the friction mechanisms, so as to engage the overdrive speed stage, or the directly coupled speed stage, according to a balance relationship between a throttle pressure and a governor pressure, and, when override pressure is supplied to an override port of this direct/overdrive shift valve, it is prevented from providing the overdrive speed stage. A downshift pressure selector valve supplies pressure to the override port when and only when there is present at least one of the lower range pressure, the kickdown pressure, and the holddown pressure signal.

4 Claims, 1 Drawing Figure

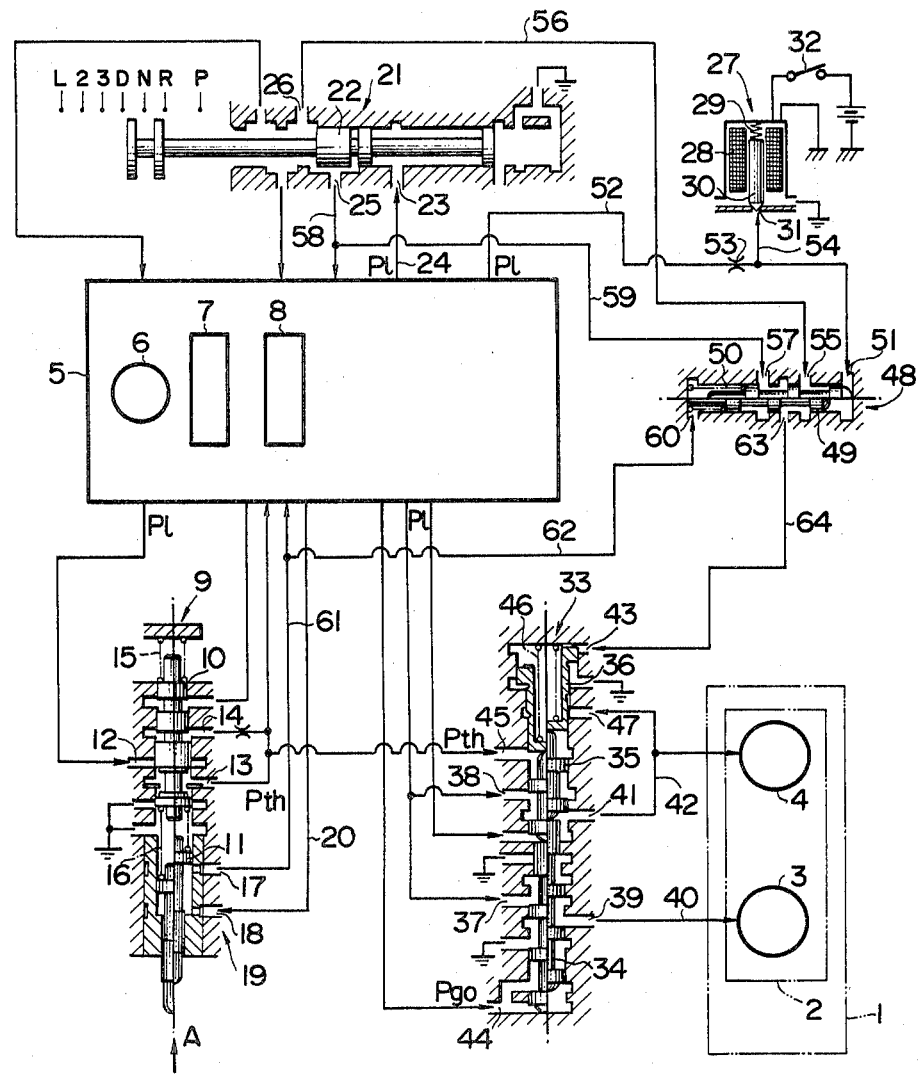

AUTOMATIC TRANSMISSION CONTROL SYSTEM WITH HOLDDOWN DEVICE

BACKGROUND OF THE INVENTION

The present invention relates to an automatic transmission for use in a vehicle, and more particularly relates to a hydraulic fluid pressure control system for controlling the engagement of the gear speed stages of such a transmission.

Various automatic transmissions for use in vehicles are well known. Such an automatic transmission generally comprises a gear transmission mechanism which comprises a plurality of friction engaging mechanims, and one or another of a plurality of gear speed stages is achieved by selectively providing operating fluid pressures to various ones of the friction engaging mechanisms. Further, various hydraulic fluid pressure control systems are well known for controlling said selective supply of operating fluid pressures to the friction engaging mechanism. Such a hydraulic fluid pressure control system generally comprises: a source of hydraulic fluid pressure such as a pump; a line fluid pressure control valve which modifies the fluid pressure supplied from the fluid pressure source and produces a line fluid pressure which is regulated to an appropriate line fluid pressure level; a throttle fluid pressure control valve which modifies the line fluid pressure and produces a throttle fluid pressure which increases in accordance with increase of a parameter representative of the load upon the internal combustion engine of the vehicle—in most cases, in accordance with increase of throttle opening of the engine, which is taken as indicative of engine load; a governor fluid pressure control valve, which modifies the line fluid pressure and produces a governor fluid pressure which increases in accordance with increase of the velocity of the vehicle; a manual selector valve which is controlled by hand by the driver of the vehicle and which is selectable between a plurality of positions which correspond to desired ranges of gear speed stages, typically including a "D" range and at least one forward range which is not the "D" range; and a plurality of speed shift valves, which selectively shift supply of actuating fluid pressures to the plurality of friction engaging mechanisms, according to various equilibrium relationships between the throttle fluid pressure and the governor fluid pressure, in a per se well known fashion.

Thus, in such an automatic transmission, the desired transmission speed range is manually set by the driver on the aforesaid manual selector valve, and then, within this speed range, the various speed shift valves corresponding to speeds which are allowed to be selected within this speed range are shifted to and fro according to balance relationships between the opposing governor fluid pressure and throttle fluid pressure, in accordance with the operating conditions of the vehicle and of the internal combustion engine of the vehicle, and thus the gear transmission mechanism is set to a particular speed stage.

Further, it is known for the highest speed stage of such an automatic transmission to be constructed to be an overdrive speed stage. Often, this is attained by constructing the automatic transmission with an in line overdrive mechanism. Further, it is common for the speed stage that below the overdrive speed stage to be a directly connected speed stage. The operation of such a transmission in the overdrive speed stage is very advantageous when the vehicle is being driven on the open road, as on a freeway, for improving fuel consumption of the vehicle, for improving the drivability of the vehicle, and also for improving the quality of the exhaust emissions of the engine of the vehicle. However, difficulties have in the prior art arisen with regard to operation of the hydraulic fluid pressure control mechanism for such an overdrive speed stage. First, it is desirable that the overdrive speed stage should be engaged when the vehicle is being operated at low speed, because this sharply deteriorates the quality of the exhaust emissions of the engine of the vehicle. Further, when the vehicle is to be rapidly accelerated, the overdrive speed stage should not be engaged. Yet further, as a matter of course, when the vehicle is being decelerated by the use of engine braking, by the driver of the vehicle shifting the manual shift drive from "D" range to a lower forward range such as "3" range, it is necessary, if the automatic transmission is at that time operating in the overdrive speed stage, for the transmission to be compulsorily shifted down to the next speed stage below said overdrive speed stage, i.e. the directly connected speed stage, in order for said engine braking to be performed effectively. Further, if such an overdrive speed stage is engaged before the engine of the vehicle has been fully warmed up, problems again arise with regard to the quality of the exhaust emissions in the exhaust gases of the engine.

In the prior art, it has not been possible satisfactorily to provide a simple and cost effective solution to these various problems, which is reliable during use over a long period of time, and is easy to manufacture, and which does not render the automatic transmission unduly complicated, bulky, or heavy.

SUMMARY OF THE INVENTION

Therefore, in view of the above problems encountered with a conventional hydraulic fluid pressure control system for an automatic transmission provided with an overdrive mechanism, it is an object of the present invention to provide an improved hydraulic fluid pressure control system for such an automatic transmission, in which a simple fluid pressure circuit is incorporated which, when it senses any of the abovementioned various conditions which render the engagement of the overdrive speed stage undesirable, compulsorily forces the direct/overdrive shift valve which shifts between the overdrive speed stage and the directly connected speed stage (which is lower than the overdrive speed stage by one speed stage) not to provide the overdrive speed stage, but to provide the directly connected speed stage.

It is a further object of the present invention to provide such a hydraulic fluid pressure control system for an automatic transmission, which is cheap to manufacture and reliable during operation.

It is a further object of the present invention to provide a hydraulic fluid pressure control system for an automatic transmission, in which an electrically operated fluid pressure control device is incorporated which may be controlled according to various operational conditions of the vehicle, and of the internal combustion engine of the vehicle, which render is disadvantageous to engage the overdrive speed stage.

It is a yet further object of the present invention to provide such a hydraulic fluid pressure control system for an automatic transmission for an automotive vehicle, in which the engagement of the overdrive speed stage is effectively inhibited, before the internal combustion engine of the vehicle has warmed up to a certain predetermined temperature.

According to the present invention, these and other objects are accomplished by, for an automatic transmission for an automotive vehicle, comprising a gear transmission mechanism comprising a plurality of fluid pressure actuated friction engaging mechanisms, selective supply of fluid pressure to said friction engaging mechanisms selectively providing a plurality of speed stages from said gear transmission mechanism, including an overdrive speed stage and a directly connected speed stage which is the next speed stage below said directly connected speed stage; a hydraulic fluid pressure control system, comprising: (a) a manually operated selector valve which is selectable between a plurality of speed ranges including a "D" range and at least one forward gear speed range which is not said "D" range, and which produces a lower range output fluid pressure when any forward range is selected thereon except for said "D" range; (b) a means for producing a kickdown pressure, which produces said kickdown pressure when a quantity representative of engine load rises above a predetermined level; (c) an electrically operated fluid pressure control device, which, according to selectively supply of actuating electrical energy thereto, selectively produces a holddown pressure signal, and which is controlled in accordance with operating conditions of the vehicle; (d) a direct/overdrive shift valve, comprising an override port; which, when no fluid pressure is supplied to said override port, controls supply of fluid pressur to at least one of said friction engaging mechanisms so as selectively to engage said overdrive speed stage or said directly coupled speed stage, according to a balance relationship between a throttle fluid pressure which is related to a quantity representative of engine load and a governor fluid pressure which is related to vehicle road speed, and which, when fluid pressure is supplied to said override port, controls supply of fluid pressure to said at least one friction engaging mechanism so as not to engage said overdrive speed stage, irrespective of said balance relationship between said throttle fluid pressure and said governor fluid pressure; and (e) a downshift fluid pressure selector valve, which receives supply of said lower range pressure, said kickdown pressure, and said holddown pressure signal, and which supplies fluid pressure to said override port of said direct/overdrive shift valve, when and only when at least one of said lower range pressure, said kickdown pressure, and said holddown pressure signal, is present.

According to such a construction, it is arranged that the override fluid pressure, which compulsorily shifts down said direct/overdrive shift valve so as to provide the directly connected speed stage instead of the overdrive speed stage, is provided either when said kickdown pressure is present, i.e., when said quantity representative of the load on the internal combustion signal of the vehicle rises above said predetermined level, or when said manual selector valve is set to a forward driving range other than the "D" range, or when said holddown fluid pressure signal is present. Because said holddown fluid pressure signal is produced by an electrically operated fluid pressure control device, it will be clear to one skilled in the art that the control of this electrically operated fluid pressure control device, and accordingly the production of said holddown pressure signal, may be performed in any of a great variety of ways, each of which might be appropriate to particular circumstances. Thus, within a given physical construction, any of a great possible variety of circumstances which render it undesirable to engage the overdrive speed stage of the gear transmission mechanism, may be easily used for providing said override fluid pressure, for example, by computer control of the supply of actuating electrical energy to said electrically operated fluid pressure control device. This makes for great flexibility in the application of such an automatic transmission, and of the hydraulic fluid pressure control system therefor.

Further, according to a particular aspect of the present invention, the presence of said holddown pressure signal may be coded as a zero holddown pressure, and the absence of said holddown pressure signal may be coded as a positive holddown pressure; and further, said downshift fluid pressure selector valve may comprise a bore and a valve element reciprocating within said bore between first and second positions wherein it is closest to, respectively, first and second ends of said bore, and a means for biasing said valve element towards said second end of said bore; said kickdown pressure being fed into said bore so as to act on the end of said valve element closest to said first end of said bore, and said holddown pressure being fed into said bore so as to act on the end of said valve element closest to said second end of said bore; said valve element, when it is in said first position, switching supply of said lower range fluid pressure so as to supply it to said override port of said direct/overdrive shift valve; and said valve element, when it is in said second position, switching supply of a forward fluid pressure, which is always present when said selector valve is set to "D" range or to a range which is one speed stage lower than "D" range, to said override port of said direct/overdrive shift valve; the presence of said kickdown fluid pressure biasing said valve element to its said second position so as to supply said forward fluid pressure to said override port of said direct/overdrive shift valve; the absence of said holddown pressure allowing said biasing means to bias said valve element to its said second position wherein it supplies said forward fluid pressure to said override port of said direct/overdrive shift valve; and the presence of said holddown pressure, when said kickdown fluid pressure is absent, biasing said valve element to its said first position, wherein it supplies to said override port of said direct/overdrive shift valve said lower range fluid pressure; whereby, when and only when either the holddown pressure signal, the kickdown pressure, or the lower range pressure is present, substantial fluid pressure is supplied to said override port of said overdrive shift valve.

According to such a particular construction, a simple and effective downshift fluid pressure selector valve is provided, functioning as described above. The particular mode of construction for this valve, outlined above, ensures that the valve will be cheap to make, economical of materials, and reliable during service.

Further, according to a particular operational aspect of the present invention, said electrically operated fluid pressure control device may be cntrolled to produce said holddown pressure signal when and only when engine temperature is below a certain predetermined valve; whereby, before engine warming up, said direct/overdrive shift valve is inhibited from providing the overdrive speed stage from said gear transmission mechanism.

According to this particular operational aspect of the present invention, since the electrically operated fluid pressure control device is controlled according to whether the internal combustion engine of the vehicle has reached said predetermined warmed up condition, or not, thereby the emission of noxious components in the exhaust gases of the engine, during the warming up process, may be advantageously reduced. This has a particular meaning with regard to meeting the standards for control of exhaust gas quality, which are becoming more and more severe nowadays.

BRIEF DESCRIPTION OF THE DRAWINGS

The present invention will become more fully understood from the following description of a preferred embodiment thereof, which is to be taken in conjunction with the accompanying drawing. It should be clearly understood, however, that neither the description of the embodiment, nor the drawing, is provided for any purposes other than those purely of illustration and exemplification; they are in no way to be taken as limitative of the scope of the present invention. In the drawing, the sole FIGURE is a partly schematic party sectional view, showing an automatic transmission, for a vehicle, comprising a gear transmission mechanism and a plurality of friction, engaging mechanisms in a block diagram for the purposes of simplicity, and also showing a hydraulic pressure control system which is the preferred embodiment of the hydraulic fluid pressure control system according to the present invention. The parts of this preferred embodiment of the hydraulic fluid pressure control system according to the present invention which are per se well known and conventional are also shown in block diagram form, for the purposes of convenience of explanation, and other parts are shown in longitudinal cross section.

DESCRIPTION OF THE PREFERRED EMBODIMENT

In the single FIGURE of the attached drawing, there is shown in schematic form an automatic transmission, which is controlled by a preferred embodiment of the hydraulic pressure control system according to the present invention. The automatic transmission, designated by reference numeral 1, and constituent parts thereof, are shown in schematic form as boxes in a block diagram, and the details of these parts are not given, because they are conventional and well known to those skilled in the art. Further, parts of the hydraulic pressure control system according to the preferred embodiment of the present invention, which are, again, per se well known and conventional, are designated schematically by labelled blocks, and their internal constitution and structure will not be particularly discussed here.

The automatic transmission 1 comprises a gear transmission mechanism 2, which is per se well known in the art. This gear transmission mechanism 2 comprises a plurality of friction engaging mechanisms which are again per se well known, and by selective engagement of these friction engaging mechanisms, which are individually actuated by actuating hydraulic fluid pressures provided from the hydraulic pressure control system according to the present invention, the gear transmission mechanism 2 is caused to provide any one of a plurality of gear speed stages, including a directly coupled speed stage and an overdrive speed stage. In particular, two friction engaging mechanisms of this plurality friction engaging mechanisms are designated by reference numerals 3 and 4, and are shown in block diagram form. These two friction engaging mechanisms 3 and 4 are concerned with shifting between the directly connected speed stage and the overdrive speed stage. In more detail, when the hydraulic pressure control system according to the present invention supplies actuating hydraulic fluid pressure to the friction engaging mechanism 3, which is a brake, so as to engage it, but does not supply actuating hydraulic fluid pressure to the friction engaging mechanism 4, which is a clutch, so that said friction engaging mechanism 4 is not engaged, then the gear transmission mechanism 2 is set to its overdrive speed shift stage, wherein it provides an increase of rotational speed between its input shaft and its output shaft. On the other hand, when the hydraulic pressure control system according to the present invention supplies actuating hydraulic fluid pressure to the friction engaging mechanism 4, so as to engage it, but does not supply actuating hydraulic fluid pressure to the friction engaging mechanism 3, so that said friction engaging mechanism 3 is not engaged, then the gear transmission mechanism 2 is set to its directly connected speed stage, wherein it provides no increase of rotational speed between its input shaft and its output shaft.

The hydraulic fluid pressure control system according to the present invention comprises a fluid pressure control circuit, which is only shown in schematic form, and of which the constituent parts are per se well known in their structures and functions to one skilled in the art, designated by the reference numeral 5. This fluid pressure control circuit 5 comprises a hydraulic fluid pressure pump 6, a line fluid pressure regulation valve 7, and a governor fluid pressure control valve 8, all of these elements being per se well known in the art.

The hydraulic fluid pressure pump 6 compresses hydraulic fluid such as oil, and supplies this pressurized fluid to the line fluid pressure regulation valve 7, which modifies this fluid pressure so as to produce a controlled line fluid pressure. The governor fluid pressure control valve 8 receives supply of this controlled line fluid pressure and produces as an output a governor fluid pressure Pgo, which increases according to increase of the road speed of the vehicle to which the transmission is fitted.

The reference numeral 9 denotes a throttle fluid pressure control valve, which receives supply of said line fluid pressure, and which outputs a throttle fluid pressure Pth, which increases according to increase of a parameter representative of the load on the internal combustion engine of the vehicle incorporating the transmission; usually this throttle fluid pressure control valve is actuated by movement of the throttle pedal of the vehicle, the position of which is taken as said parameter representative of engine load. Further, this throttle fluid pressure control valve incorporates a kickdown valve, which produces a so called kickdown fluid pressure when the load on the engine of the vehicle, i.e., usually, the throttle opening thereof, increases beyond a predetermined value.

In more detail, the throttle fluid pressure control valve 9 comprises upper and lower valve elements 10 and 11 which are coaxially fitted in and are slidable to and fro within a bore formed in a housing. Between these valve elements 10 and 11 there is fitted a compression coil spring 16, which biases the upper valve element 10 upwards in the drawing, and above the valve element 10 in the drawing there is fitted a compression coil spring 15, which biases it downwards in the drawing. The valve element 11 is displaced, according to the opening of the throttle valve of the engine, upwards in the drawing, in the direction shown by the arrow A, thus increasing the aforesaid biasing pressure exerted by the compression coil spring 16 on the lower end in the drawing of the upper valve element 10. The line pressure P1 is fed to an input port 12 of the throttle fluid pressure control valve 9, and communication between this input port 12 and an output port 13 of this valve is controlled by the axial movement of the upper valve element 10 within the bore of the throttle fluid pressure control valve 9. The pressure appearing at the output port 13 is fed back to a feedback port 14 of the throttle fluid pressure control valve 9. Thereby, the valve element 10 controls the communication between the input port 12 and the output port 13, according to the balance of: an upward force exerted by the compression coil spring 16, according to the amount of depression of the accelerator pedal of the vehicle; and a downward force, which is the sum of the downward force exerted by the compression coil spring 15, and a downward force exerted by the fed back throttle fluid pressure at the feedback port 14, which, as may be seen in the drawing, has a net effect to impel the valve element 10 in the downwards direction of the drawing, according to a difference in the land areas of the lands of the valve element 10 upon which it exerts pressure. By this construction, the pressure appearing at the output port 13, i.e., the throttle fluid pressure, increases according to increase of the amount of depression of the accelerator pedal of the vehicle, i.e. according to increase of the compression force exerted upwards in the drawing by the compression coil spring 16 on the upper valve element 10.

The lower valve element 11 controls communication between an input port 18 and an output port 17 which are formed in the housing of the throttle fluid pressure control valve 9. When the throttle pedal of the vehicle is depressed by more than a certain amount, communication between this input port 18 and this output port 17 is established. A suitable fluid pressure, such as line fluid pressure or a detent fluid pressure obtained by modifying the line fluid pressure, is fed to the input port 18 via a fluid conduit 20 from the fluid pressure control circuit 5, and thus a kickdown fluid pressure appears at the output port 17 when, and only when, the accelerator pedal of the vehicle is depressed by more than said certain predetermined amount. The ports 17 and 18, and the valve element 17, are thus comprised in a kickdown valve assembly 19. The kickdown fluid pressure appearing at the output port 17 is led, via fluid pressure conduits 61 and 62, a downshift fluid pressure selector valve 48 which will be explained later. Also, this kickdown fluid pressure is supplied to the fluid pressure control circuit 5, in order to perform various functions therein, but this is not relevant to the present invention.

The reference numeral 21 denotes a manually operated selector valve, which is constructed so as to be moved by hand by the driver of the vehicle, and on which this driver sets the gear speed range in which he desires to operate the vehicle. This manual selector valve 21 comprises a valve element 22 which is slidable to and fro within a bore formed in a housing. The valve element 22 may be moved to any one of a plurality of positions according to desired operating ranges for the automatic transmission, including parking (P) position, reverse (R) position, neutral (N) position, drive (D) position, "3" position, "2" position, and low (L) position. The meanings of these range symbols are well known to one skilled in the art. The line fluid pressure is supplied to an input port 23 of the manual selector valve 21, via a fluid passage 24, from the fluid pressure control circuit 5.

The manual selector valve 21 has various output ports, at which various different output fluid pressures are produced, when the valve element 22 is at various different positions; but only two of these output fluid pressures are relevant to the present invention. When the valve element 22 is set to the (N) position as shown in the figure, then the line pressure supplied to the input port 23 thereof is not supplied to any of the output ports of the manual selector valve 21. When the valve element 22 is shifted to the (D) position, then the line fluid pressure appears at the output port 25 of the manual selector valve 21. Further, when the valve element 22 is shifted to the "3" position, then the line pressure supplied to the input port 23 thereof appears at both the output port 5 and the output port 26 of the manual selector valve 21. The structure and operation of this kind of manual selector valve is per se conventional and well known to one skilled in the art.

The reference numeral 27 denotes a solenoid operated valve. This solenoid operated valve 27 comprises a solenoid 28, a plunger 30 formed with a valve element at its lower end in the drawing, a compression coil spring 29 which biases the plunger 30 downwards in the drawing, and a valve port 31, the opening and closing of which is controlled by the aforesaid valve element formed on the lower end in the drawing of the plunger 30. The upper side, as seen in the figure, of the valve port 31 is communicated with a fluid drain passage. Accordingly, when actuating electrical energy is not supplied to the solenoid 28, then the compression coil spring 29 biases the plunger 30 and the valve element formed on its tip downwards in the figure so as to close the valve port 31. On the other hand, when actuating electrical energy is supplied to the solenoid 28, then its magnetic attraction pulls the plunger 30 upwards in the drawing against the biasing action of the compression coil spring 29, so as to open the valve port 31. As a result, the fluid passage 54 which is communicated with this valve port 31 is drained and the pressure therein is brought to effectively atmospheric pressure.

The energization of the solenoid 28 is performed under the control of a switch 32. This switch 32 is only shown in schematic form in the drawing, but is in fact so constituted that its ON/OFF operation is controlled according to the operational conditions of the vehicle, and of the internal combustion engine thereof. In particular, this switch 32 is so constituted as to be controlled in its ON/OFF operation by operational conditions of the vehicle which influence the quality of the exhaust gases thereof. In fact, in the shown application of the preferred embodiment of the hydraulic fluid pressure control system according to the present invention, this switch 32 is constituted so as to be closed when the temperature of the cooling water of the internal combustion engine of the vehicle is below a certain predetermined value; and, on the other hand, when the engine of the vehicle reaches a predetermined stage in its warming up process, and the temperature of the cooling water thereof rises above said certain predetermined value, the switch 32 opens.

The reference numeral 33 denotes a shift valve. This shift valve is the direct/overdrive shift valve, which selectively controls the supply of operating hydraulic fluid pressure to the friction engaging mechanism 3 and the friction engaging mechanism 4 comprised within the overdrive transmission mechanism of the gear transmission mechanism 2. Thus, this direct/overdrive shift valve 33 controls shifting of the automatic transmission up from the directly coupled speed stage to the overdrive speed stage, and down from the overdrive speed stage to the directly coupled speed stage.

In its structure, the direct/overdrive shift valve 33 comprises two axially opposed upper and lower valve elements 33 and 34 which slide to and fro within a bore formed within a housing, and also comprises a piston 36 which is axially opposed to the upper valve element 35 and also reciprocates within said bore.

When an override fluid pressure which will be described later is not supplied to an override port 43 of the direct/overdrive shaft valve 33, then the valve elements 34 and 35 are shifted down their downwardly biased positions, as shown on the left hand side of the axis of the direct/overdrive shift valve 33 in the figure, and their upwardly biased positions, as shown on the right hand side of the axis of the direct/overdrive shift valve 33 in the figure, according to a balance relationship between a force directed downwards in the figure, which is produced by the throttle fluid pressure Pth, which is supplied to a throttle fluid pressure input port 45, acting on the upper end in the figure of the valve element 35, and a force acting upwards in the figure, produced by the governor fluid pressure Pgo, which is supplied to a governor fluid pressure input port 44, acting on the lower end of the valve element 34 in the figure. This is the case, provided that the throttle fluid pressure Pth is high enough to drive the piston 36 upwards in the figure, against the biasing action of the compression coil spring 46, which tends to urge the piston 36 downwards in the drawing.

When the throttle fluid pressure prevails over the governor fluid pressure, i.e, when the load on the engine of the vehicle is relatively high in relation to the road speed thereof, then the valve elements 34 and 35 are driven to their downward positions as shown on the left hand side of the axis of the direct/overdrive shift valve 33 in the figure, and in this condition the line fluid pressure, which is supplied to line fluid pressure input ports 37 and 38 of the overdrive shift valve 33, is not conducted to the friction engaging mechanism 3 via an output port 39 and a fluid conduit 40, but is supplied to the friction engaging mechanism 4, via an output port 41 and a fluid conduit 42. Accordingly, the overdrive mechanism of the gear transmission mechanism 2 is set to its directly coupled speed stage. On the other hand, when the governor fluid pressure prevails over the throttle fluid pressure, i.e. when the road spped of the vehicle is relatively high in relation to the load on the engine thereof, then the valve elements 34 and 35 are driven to their upwardly biased positions as shown on the right hand side of the axis of the direct/overdrive shift valve 33 in the figure, and in this condition in the line pressure which is supplied to the line pressure input port 37 is communicated to the output port 39, and thence via the fluid conduit 40 is conducted to the friction engaging mechanism 3, while on the other hand the line pressure which is supplied to the line pressure input port 38 is not conducted to the output port 41, and thus is not conducted via the fluid conduit 42 to the friction engaging mechanism 4, and accordingly the overdrive mechanism of the gear transmission mechanism 2 of the automatic transmission is set to its overdrive speed stage. This operation of the direct/overdrive shift valve is per se well known and conventional.

When, on the other hand, the throttle fluid pressure Pth present at the throttle fluid pressure input port 45 is not sufficient to overcome the compression force of the compression coil spring 46, then the contacted combination of the valve elements 34 and 35 and the piston 36 reciprocates upwards and downwards within the bore of the direct/overdrive shift valve 33, according to a balance relationship between the governor fluid pressure Pgo supplied to the governor fluid pressure input port 44 and the compression force of the compression coil spring 46, and is unaffected by the throttle fluid pressure Pth. This provides a vertical portion, in the shift diagram showing a shift line between the directly connected speed stage and the overdrive speed stage on a graph of engine load against vehicle speed, in the low engine load region. It should be noted that the fluid pressure present within the fluid conduit 42 is fed back to a feedback port 47 of the direct/overdrive shift valve 33, and, according to a difference in the cross sectional areas of upper and lower parts of the piston 36, it exerts an upward force on the piston 36, in order to provide a certain desirable hysteresis effect to the operation of the aforesaid contacted combination, within this aforesaid low engine load region.

On the other hand, when fluid pressure is supplied to the override port 43 of the direct/overdrive shift valve 33, then this override fluid pressure positively pushes the piston 36 downwards in the drawing, so as positively to bias the valve element 34 and the valve element 35 to their downward positions as shown on the left hand side of the axis of the direct/overdrive shift valve 33 in the drawing, wherein, as explained above, the line pressure supplied to the line pressure input port 38 is supplied via the output port 41 and the fluid conduit 42 to the friction engaging mechanism 4, but the line pressure supplied to the line pressure input port 37 is not communicated to the output port 39, and thus is not conducted via the fluid conduit 40 to the friction engaging mechanism 3, and accordingly the overdrive mechanism of the gear transmission mechanism 2 of the automatic transmission 1 is put positively into its directly connected condition. In other words, the supply of this override fluid pressure to the override port 43 of the direct/overdrive shift valve 33 ensures that the automatic transmission 1 remains in its directly connected speed stage, if it is in that speed stage, or alternatively ensures that it is immediately shifted down to its directly connected speed stage, if it is in its overdrive speed stage.

The reference numeral 48 denotes a downshift fluid pressure selector valve. This downshift fluid pressure selector valve 48 controls the supply of fluid pressure to the override fluid pressure port 43 of the direct/overdrive shift valve 33, and comprises a valve element 49 which is slidable to and fro within a bore formed in a housing. The valve element 49 is biased rightwards in the drawing by a compression coil spring 50. The kickdown fluid pressure, present at the output port 17 of the kickdown valve 19 when the accelerator pedal has been depressed beyond the aforesaid certain predetermined amount, as described above, is led via the fluid conduits 61 and 62 to an input port 60 at the left hand end in the figure of the downshift fluid pressure selector valve 48, so as to apply force to the left hand end of the valve element 49. A supply of line fluid pressure from the fluid pressure control circuit 5 is conducted, through a fluid conduit 52 in which is incorporated a throttling element 53, to an input port 51 at the right hand end in the figure of the downshift fluid pressure selector valve 48, so as to apply a force to the right hand end of the valve element 49 in the drawing; and from an intermediate part of the fluid conduit 52, downstream of the throttling element 53, there is branched a fluid conduit 54 which leads to the port 31 of the solenoid operated valve 27, as described above. The fluid pressure present at the output port 25 of the manual selector valve 21, which is as described above present when the manual selector valve 21 is selcted to (D) range or "3" range, is conducted via a fluid conduit 58 and a fluid conduit 59 to an input port 57 of the downshift fluid pressure selector valve 48; and further the fluid pressure present at the outport port 26 of the manual selector valve 21, which is present when the manual selector valve 21 is selected to the "3" range, the "2" range, or the (L) range, but which is not present when the manual selector valve 21 is selected to the (D) range, is conducted via a fluid conduit 56 to an input port 55 of the downshift fluid pressure selector valve 48. The override fluid pressure, which is supplied to the override port 43 of the direct-/overdrive shift valve 33 via a fluid conduit 64, is taken out from an output port 63 of the downshift fluid pressure selector valve 48. The downshift fluid pressure selector valve 48 is so constructed that, when its valve element 49 is in its leftward biased position, as shown below the axis of the downshift fluid pressure selector valve 48 in the figure, then the input port 55 is communicated with the output port 63, while the input port 57 is not communicated with the output port 63. On the other hand, when the valve element 49 of the downshift fluid pressure selector valve 48 is in its rightward biased position, as shown above the axis of the downshift fluid pressure selector valve 48 in the figure, then the input port 57 is communicated with the output port 63, while the input port 55 is not communicated with the output port 63.

This hydraulic pressure system operates as follows. First it should be understood that when the vehicle is being driven in the forward direction, since the manual selector valve 21 is set to (D) position, "3" position, "2" position, or (L) position, line fluid pressure always is present at the input port 57 of the downshift fluid pressure selector valve 48. Now, assuming that the manual selector valve 21 is shifted to the "D" position, so that the automatic transmission is operating in the drive range wherein use of the overdrive speed stage may be required in appropriate operational conditions, in this "D" range no fluid pressure is present at the output port 26 of the manual selector valve 21, and accordingly no fluid pressure is present at the input port 55 of the downshift fluid pressure selector valve 48. In this condition, if the internal combustion engine has already arrived at the predetermined warming up condition explained above, then the switch 32 will be open, and accordingly the valve element formed at the lower tip in the drawing of the plunger 30 will be in its position to close the port 31, and accordingly no escape of fluid pressure will be possible through the port 31 from the fluid passage 54, and accordingly line fluid pressure will be present at the input port 51 of the downshift fluid pressure selector valve 48. If, in this condition, no kickdown fluid pressure is present at the input port 60 of the downshift fluid pressure selector valve 48, because the accelerator pedal of the vehicle is not depressed beyond the aforesaid predetermined level and accordingly the kickdown valve 19 is not producing the kickdown fluid pressure at its output port 17, then the valve element 49 of the downshift fluid pressure selector valve 48 will be biased by the line pressure appearing at its input port 51 in the leftwards direction as shown in the figure, against the compression force of the compression coil spring 50, and accordingly its input port 55 will be communicated to its output port 63, and its input port 57 will be cut off from communication with its output port 63. In this condition, since as explained above no fluid pressure is present at the input port 55, thereby no override fluid pressure is present at the output port 63, and accordingly no override fluid pressure is communicated to the override port 43 of the direct/overdrive shift valve 33. In this condition, the direct/overdrive shift valve 33 operates, as explained above, according to a balance relationship between the throttle fluid pressure and the governor fluid pressure. Thus, engagement of the overdrive speed stage of the gear transmission mechanism 2 is possible. This is the basic state of the above outlined hydraulic fluid pressure control system.

Now, suppose that from this condition the manual selector valve 21 is manually shifted by the driver of the vehicle to the "3" range, in order to slow down the motion of the vehicle by using engine braking. According to this shift operation, now a fluid pressure appears at the output port 26 of the manual selector valve 21, and is conducted through the fluid conduit 56 to the input port 55 of the downshift fluid pressure selector valve 48. Because this port 55 is currently communicated to the output port 63, thereby fluid pressure appears in the fluid conduit 64, and is transmitted to the override port 43 of the direct/overdrive shift valve 33. Thus, as explained above, this fluid pressure biases the piston 36 downwards in the drawing so as positively to interrupt supply of line fluid pressure to the friction engaging mechanism 3 via the fluid conduit 40 from the output port 39, and so as positively to provide operating fluid pressure for the friction engaging mechanism 4 from the output port 41 via the fluid conduit 42, thus positively putting the gear transmission mechanism 2 into its directly connected speed stage. Thus, if the automatic transmission in fact had been operating in the overdrive speed stage, it is at this time definitely immediately downshifted to the directly connected speed stage. This provides good engine braking.

Further, suppose on the other hand that the vehicle is being driven in the "D" range after the engine thereof has been warmed up, so that the hydraulic fluid pressure control system is in its basic state as explained above, with no override fluid pressure being provided at the output port 63 of the downshift fluid pressure selector valve 48, and with the valve element 49 of this valve 48 in its leftwards biased position as shown below the central axis of the valve 48 in the drawing. If now the throttle pedal of the vehicle is depressed by more than the aforesaid certain predetermined amount, so that the kickdown valve 19 provides the kickdown fluid pressure at its output port 17, then this kickdown fluid pressure is conducted via the fluid pressure conduits 61 and 62 to the input port 60 of the downshift fluid pressure selector valve 48. Thus, the biasing force urging the valve element 49 rightwards in the drawing is now equal to the sum of the forces exerted by the compression coil spring 50 and by this kickdown pressure acting on the left hand end of the valve element 49. The downshift fluid pressure selector valve 48 is so designed that this combination of forces overcomes the effect of the force exerted on the right hand end of the valve element 49 by the line pressure which, as explained above, is being supplied to the input port 51 of the downshift fluid pressure selector valve 48, and accordingly the valve element 49 is shifted rightwards as shown above the central axis of the valve 48 in the drawing. Thus, in this condition, the line pressure which is being supplied to the input port 57 of the downshift fluid pressure selector valve 48 is now transmitted to the output port 63 thereof, and accordingly, via the fluid conduit 64, is conducted to the override port 43 of the direct/overdrive shift valve 33, and, again, positively shifts the gear transmission 2 into its directly connected speed stage, as explained above. This provides a reliable kickdown arrangement.

The above outlines the operation of the downshift fluid pressure selector valve 48 in the case that the vehicle is being driven in the forward direction after having been warmed up. On the other hand, if the vehicle is being driven in the forward direction before being warmed up, in this state the switch 32 is closed, because the engine of the vehicle has not yet reached the aforesaid predetermined temperature. Accordingly, actuating electrical energy is being supplied to the solenoid 28, and the solenoid 28 is attracting the plunger 30 upwards in the drawing so as to remove its lower end away from the valve port 31 and so as to communicate the fluid conduit 54 to be drained. Accordingly, because of the provision of the throttling element 53, the fluid pressure within this fluid conduit 54, and at the input port 51 of the downshift fluid pressure selector valve 48, is substantially atmospheric pressure. In this condition, the compression force of the compression coil spring 50 is sufficient to bias the valve element 49 of the downshift fluid pressure selector valve 48 to its rightwards position as shown on the upper side of the axis thereof in the figure. In this condition, the line pressure which is being supplied to the port 57 is positively communicated to the output port 63 of the downshift fluid pressure selector valve 48, and accordingly the override fluid pressure is always present at the input port 43 of the direct/overdrive shift valve 33. According to this, the direct/overdrive shift valve 33 is effectively prevented from putting the gear transmission mechanism 2 into its overdrive speed stage, irrespective of any balance relationship between the throttle fluid pressure Pth and the governor fluid pressure Pgo. Thus, until the internal combustion engine of the vehicle has reached the aforesaid predetermined temperature from cold starting, the overdrive mechanism of the gear transmission mechanism 2 is never set to its overdrive stage.

In summary, the operation of the downshift fluid pressure selector valve 48 is as follows: it supplies fluid pressure to the override port 43 of the direct/overdrive shift valve 33 when and only when at least one of the following conditions is satisfied: (1) fluid pressure is present at its input port 55, i.e., the vehicle is in a forward speed range other than (D) range; (2) the kickdown fluid pressure is present at its port 60, i.e., the accelerator pedal of the vehicle is depressed by more than said predetermined amount; and (3) no fluid pressure is present at its input port 51, in other words, the engine has not yet reached said predetermined warming up condition.

In other embodiments of the present invention, the holddown pressure signal transmitted to the right hand end of the downshift fluid pressure selector valve 48 from the electrically controlled solenoid device 27 could be provided in a different fashion. In the shown embodiment, the fluid pressure signal provided from the electrically operated solenoid device 27 has been coded as a zero pressure level when the holddown signal is present, i.e., the overdrive shift valve 33 is to be kept as providing the directly connected speed stage for the gear transmission mechanism 2, and as a line pressure signal level when no holddown signal is being provided. This is according to the operation of the shown embodiment of the electrically controlled solenoid device 27. However, in other embodiments, other possible coding arrangements, such as the reverse of that described above, would be possible for this holddown pressure signal.

Although the present invention has been shown and described in terms of a preferred embodiment thereof, and in language more or less specific with regard to structural features thereof, and with reference to the illustrative drawing, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawing.

We claim:

1. For use with an automatic transmission for an automotive vehicle, comprising a gear transmission mechanism comprising a plurality of hydraulic fluid pressure actuated friction engaging mechanisms, and wherein a selective supply of actuating hydraulic fluid pressure to said friction engaging mechanisms selectively provides a plurality of speed stages from said gear transmission mechanism including an overdrive speed stage and a directly coupled speed stage which is the next speed stage below said overdrive speed stage;

a hydraulic fluid pressure control system, comprising:
  (a) a manually operated selector valve which is manually selectable between a plurality of speed ranges including a "D" range, and at least one forward speed range which is not said "D" range, and which produces a forward pressure when any forward speed range is selected thereon, and a lower range pressure when any forward speed range except said "D" range is selected thereon;
  (b) a means for producing a kickdown pressure, which produces a kickdown pressure when and only when the value of a quantity representative of engine load is above a predetermined value;
  (c) an electrically operated hydraulic fluid pressure control device, which, according to a selective supply of actuating electrical energy thereto, selectively produces a holddown pressure; and which is controlled in accordance with operating conditions of the vehicle;
  (d) a direct/overdrive shift valve, comprising a sole override port; which, when no overriding hydraulic fluid pressure is supplied to said override port, controls the supply of hydraulic fluid pressure to at least one of said friction engaging mechanisms so as selectively to engage either said overdrive speed stage or said directly coupled speed stage of said gear transmission mechanism according to a balance relationship between a throttle pressure which is related to a quantity representative of engine load and a governor pressure which is related to vehicle road speed; and which, when overriding hydraulic fluid pressure is supplied to said override port, controls supply of hydraulic fluid pressure to said at least one friction engaging mechanism so as to definitely not engage said overdrive speed stage of said gear transmission mechanism, irrespective of said balance relationship between said throttle pressure and said governor pressure; and (e) a downshift fluid pressure selector valve, which has a single valve bore having four inputs ports adapted to be supplied with said forward pressure, said lower range pressure, said kickdown pressure and said holddown pressure, respectively, as input pressure signals, and one output port connected to said override port of said direct/overdrive shift valve, a single valve element slidably mounted in said valve bore, and a single bias spring, said output port delivering a substantial output pressure when either said lower range pressure is present or said kickdown pressure is present or said holddown pressure is absent.

2. A hydraulic fluid pressure control system according to claim 1, wherein said kickdown pressure is fed into said bore so as to act on the end of said valve element closest to a first end of said bore, and said holddown pressure is fed into said bore so as to act on the end of said valve element closest to a second end of said bore; said valve element, when it is in said first position, switching supply of said lower range fluid pressure so as to supply it to said override port of said direct/overdrive shift valve; and said valve element, when it is in said second position, switching supply of a forward fluid pressure, which is always present when said selector valve is set to "D" range or to a range which is one speed stage lower than "D" range, to said override port of said direct/overdrive shift valve; the presence of said kickdown fluid pressure biasing said valve element to its said second position so as to supply said forward fluid pressure to said override port of said direct/overdrive shift valve; the absence of said holddown pressure allowing said biasing means to bias said valve element to its said second position wherein it supplies said forward fluid pressure to said override port of said direct/overdrive shift valve; and the presence of said holddown pressure, when said kickdown fluid pressure is absent, biasing said valve element to its said first position, wherein it supplies to said override port of said direct/overdrive shift valve said lower range fluid pressure; whereby, when and only when either the holddown pressure signal, the kickdown pressure, or the lower range pressure is present, substantial fluid pressure is supplied to said override port of said overdrive shift valve.

3. A hydraulic fluid pressure control system according to claim 1, wherein said elctrically operated fluid pressure control device comprises a solenoid which is selectively supplied with actuating electrical energy, a plunger, a means for biasing said plunger in a first direction, and a port which is closed by said plunger when said plunger is in its extreme position in said first direction; said solenoid, when it is supplied with actuating electrical energy, attracting said plunger in the direction opposite to said first direction so as to open said port; fluid pressure supplied to one side of said port, when said port is open, being drained; throttle supply of said line pressure being supplied as said holddown pressure, and being also supplied to said one side of said port; whereby, when actuating electrical energy is supplied to said solenoid, said throttled supply of line pressure is drained through said port, and thus said holddown pressure is not present; and, when actuating electrical energy is not supplied to said solenoid, said throttled supply of line pressure is not drained through said port, so that said holddown pressure is present.

4. A hydraulic fluid pressure control system according to any one of claims 1, 2, or 3 claim, wherein said electrically operated fluid pressure control device is controlled to produce said holddown pressure signal when and only when engine temperature is below a certain predetermined value; whereby, before engine warming up, said direct/overdrive shift valve is inhibited from providing the overdrive speed stage from said gear transmission mechanism.

* * * * *